United States Patent [19]

Quentin

[11] Patent Number: 4,900,802
[45] Date of Patent: Feb. 13, 1990

[54] MOLDABLE/EXTRUDABLE THERMOTROPIC AROMATIC COPOLYESTERAMIDES

[75] Inventor: Jean-Pierre Quentin, Lyons, France

[73] Assignee: Rhone-Poulenc Chimie, Courbevoie, France

[21] Appl. No.: 217,350

[22] Filed: Jul. 11, 1988

[30] Foreign Application Priority Data

Jul. 10, 1987 [FR] France ................ 87 10178

[51] Int. Cl.$^4$ ............................................ C08G 69/44
[52] U.S. Cl. .................................... 528/190; 528/176; 528/184; 528/191; 528/194
[58] Field of Search ............... 528/176, 184, 190, 191, 528/194

[56] References Cited

U.S. PATENT DOCUMENTS 4,169,933 10/1979 Jackson, Jr. et al. ................ 528/190
4,717,624 1/1988 Ikenaga et al. ...................... 528/190

FOREIGN PATENT DOCUMENTS 0063881 11/1982 European Pat. Off. .
0066359 12/1982 European Pat. Off. .

Primary Examiner—Harold D. Anderson
Assistant Examiner—T. Mosley
Attorney, Agent, or Firm—Sherman and Shalloway

[57] ABSTRACT

High molecular weight thermotropic aromatic copolyesteramides which can be molded/extruded into a wide variety of useful shaped articles having improved thermomechanical properties are comprised of recurring structural units of the formulae (I), optionally (II), (III) and (IV), wherein:

(I) represents the structure:

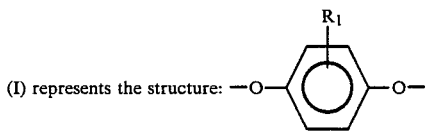

in which $R_1$ is a methyl or ethyl radical or a chlorine or bromine atom, with the proviso that the units (I) may be identical or different;

(II) represents the structure:

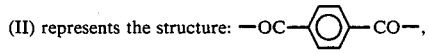

(III) represents the structure:

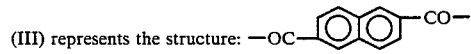

(IV) represents the structure:

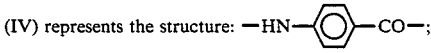

the molar ratio of the units (I) relative to the sum of the units (II)+(III) ranges from 0.95 to 1.05;

the amount of the units (II) in the mixture of (II)+(III) ranges from 0 to 80 mol % and that of the units (III), on the same basis, ranges from 100 to 20 mol %;

the amount of the units (IV), expressed relative to the amount of the units (I), ranges from 5 to 100 mol %; and said copolyesteramides have a flow temperature ranging from 200° to 350° C.

13 Claims, No Drawings

MOLDABLE/EXTRUDABLE THERMOTROPIC AROMATIC COPOLYESTERAMIDES

CROSS-REFERENCE TO COMPANION APPLICATIONS

My copending applications, Ser. No. 129,289, filed Dec. 7, 1987, now abandoned and Ser. No. 07/217,353 pending and Ser. No. 07/217,352, now abandoned both filed concurrently herewith and all assigned to the assignee hereof.

BACKGROUND OF THE INVENTION

1. Field of the Invention

The present invention relates to novel moldable/extrudable thermotropic aromatic copolyesteramides and to the preparation thereof from at least one substituted hydroquinone or ester/amide-forming derivative thereof, from a mixture of aromatic dicarboxylic acids of ester/amide-forming derivatives thereof, and from at least one aromatic carboxylic amino acid or ester/amide-forming derivative thereof.

2. Description of the Prior Art

Thermotropic polyesters prepared from one or more diphenols and one or more aromatic and/or cycloaliphatic dicarboxylic acids are known to this art. Polyesters of this type are described, for example, in U.S. Pat. No. 4,118,372. Among the polyesters described therein, those produced from a substituted hydroquinone (or ester-forming derivative thereof), terephthalic acid (or ester-forming derivative thereof) and from 2,6-dicarboxynaphthalene (or ester-forming derivative thereof) are particularly valuable polymers.

SUMMARY OF THE INVENTION

A major object of the present invention is the provision of novel thermotropic polyesters which can be prepared more economically than the aforenoted copolyesters known to the art, by employing the substituted hydroquinone (or ester/amide-forming derivative thereof) and the 2,6-dicarboxynaphthalene (or ester/amide-forming derivative thereof), which are costly reactants, in lower concentrations in the starting reactant mixture and adding thereto a suitable supplementary reactant which is less costly and which is readily available on an industrial scale.

Another object of this invention is the provision of novel thermotropic copolyesteramides which have improved thermomechanical properties vis-a-vis the known copolyesters discussed above, especially as regards maintaining the values of the torsional moduli as a function of temperature.

It has now unexpectedly been found that such objectives may be attained by the use of the additional reactant para-aminobenzoic acid or an ester/amide-forming derivative thereof.

Briefly, the present invention features novel moldable/extrudable thermotropic aromatic copolyesteramides comprising recurring units of the formulae (I), optionally (II), (III) and (IV), wherein:

(I) represents the structure: 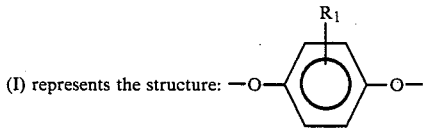

in which $R_1$ is a methyl or ethyl radical or a chlorine or bromine atom, with the proviso that the units (I) may be identical or different;

(II) represents the structure: 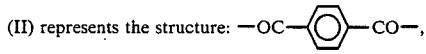

(III) represents the structure: 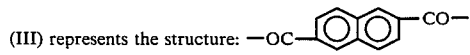

(IV) represents the structure: 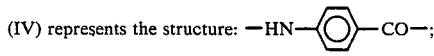

the molar ratio of the units (I) relative to the sum of the units (II)+(III) ranges from 0.95 to 1.05;

the amount of the units (II) in the mixture of (II)+(III) ranges from 0 to 80 mol % and that of the units (III), on the same basis, ranges from 100 to 20 mol %;

the amount of the units (IV), expressed relative to the amount of the units (I), ranges from 5 to 100 mol %; and said copolyesteramides have a flow temperature ranging from 200° to 350° C.

DETAILED DESCRIPTION OF THE PREFERRED EMBODIMENTS OF THE INVENTION

More particularly according to the present invention, the recurring structural units of the formula (I) are provided by a hydroquinone which is monosubstituted (by a methyl or ethyl radical or by a chlorine or bromine atom) or by a diester thereof. It will be appreciated that the units (I) may also be provided by a mixture of two or more monosubstituted hydroquinones or diesters thereof envisaged by the present invention.

The recurring structural units of the formula (II) are provided by terephthalic acid or from an ester/amide-forming derivative thereof, such as, for example, a dihalide or a diester.

The recurring structural units of the formula (III) are provided by 2,6-dicarboxynaphthalene or from an ester/amide forming derivative thereof, such as, for example, a dihalide or a diester.

The recurring structural units of the formula (IV) are derived from para-aminobenzoic acid or from an ester/amide-forming derivative thereof, such as, for example, the compound obtained by acylation of the amine group or the compound obtained by esterification of the acid group or a halide of the acid group.

In a preferred embodiment of the invention, the copolyesteramides have the formula given above, in which:

the amount of the units (II) in the mixture of (II)+(III) ranges from 20 to 70 mol % and that of the units (III), on the same basis, ranges from 80 to 30 mol %; and the amount of the units (IV), expressed relative to the amount of the units (I), ranges from 10 to 60 mol %.

Among the aromatic copolyesteramides of this preferred group, those which are most particularly suitable are the polymers having a structural formula in which the units (I) are identical to each other, with the substituent $R_1$ being a methyl radical or a chlorine atom; such units (I) are derived from methylhydroquinone or from chlorohydroquinone or diester thereof.

The copolyesteramides according to the invention have a molecular weight which is sufficiently high to permit them to be shaped by any known process, such as molding, spinning and conversion into film. These polymers are insoluble in the usual solvents employed for the measurement of inherent viscosity such as, for example, para-chlorophenol/1,2-dichloroethane mixtures. Thus, it has not been possible to measure the inherent viscosity in this case.

As regards the flow temperature, this preferably ranges from 260° to 330° C. By "flow temperature" is intended the temperature at which the edges of a flake-shaped sample of polymer or of a cut fiber begin to become rounded. This temperature is determined by observing the sample visually on a cover glass at a suitable rate of temperature increase, generally on the order of 10° to 20° C./minute, such observation being carried out using a microscope equipped with a heated stage, commercially available under the trademark Thermopan.

The copolyesteramides according to the present invention also include polymers whose structural formula may additionally contain aromatic recurring units providing ester and amide groups (dioxy units and/or dicarbonyl units and/or mixed secondary amino/carbonyl units) which have a structure other than that of the units (I), (II), (III) and (IV), the total amount of these additional units being not more than 10 mol % relative to the amount of the units (I). Exemplary of such additional recurring units are those of the formulae:

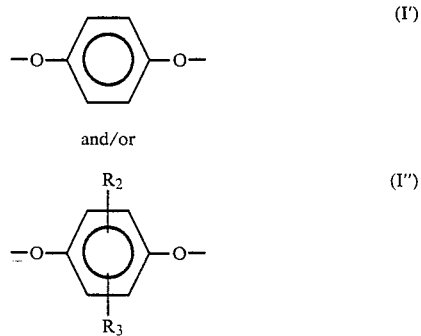

in which $R_2$ and $R_3$, which may be identical or different, each have the same definition given above for $R_1$, with the proviso that the units (I'') may be identical or different,

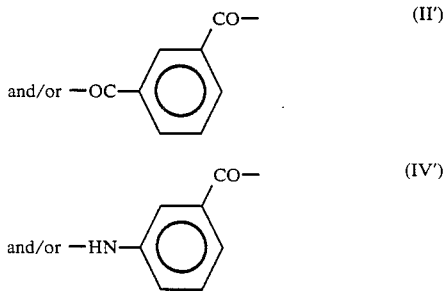

The recurring structural units of the formula (I') are provided by unsubstituted hydroquinone or diester thereof.

The recurring structural units of the formula (I'') are provided by a disubstituted hydroquinone or diester thereof or from a mixture of disubstituted hydroquinones or diesters thereof.

The recurring structural units of the formula (II') are provided by isophthalic acid or ester/amide-forming derivative thereof, such as, for example, a dihalide or a diester.

The recurring structural units of the formula (IV') are provided by meta-aminobenzoic acid or ester/amide-forming derivative thereof.

It will be appreciated that the total amount of all the dioxy recurring units and of all the dicarbonyl recurring units which are then present in the copolyesteramide will need to be such that the molar ratio of all the dioxy units relative to the sum of all the dioxy units + all the dicarbonyl units ranges from 0.95 to 1.05.

The copolyesteramides according to the present invention exhibit the major characteristic of being thermotropic, namely, they are capable of forming anisotropic melts which are easy to shape by spinning, film-forming or molding. The thermotropy is easy to demonstrate when the polymer is observed in melt form in an optical system equipped with two crossed polarizers (90°): birefringence and transmission of polarized light through the crossed polarizers occur in the case of anisotropic specimens. The demonstration of anisotropy in the polyesteramides according to the present invention is carried out by the TOT thermooptical method described in French Patent No. 2,270,282.

Consequently, melts in an anisotropic state have a specific orientation and a relatively high degree of organization, which can also be demonstrated in shaped articles such as filaments, films and molded objects, thus providing (even in the crude state) improved properties such as modulus and tenacity (which are not usually found in isotropic raw materials).

It should be appreciated that these anisotropic melts have an anisotropy range extending over at least 30° C. By "anisotropy range" is intended the temperature interval beginning with the temperature at which the birefringence and the transmission of light through the two crossed polarizers appear and which is above this temperature, an interval which has a variable upper limit and in which the melt is anisotropic without any danger of decomposition of the copolyesteramide.

The copolyesteramides according to the present invention may be shaped using any known process such as molding, spinning or film-forming, etc., and, obviously, by carrying out each operation within the anisotropy range so as to produce articles which have satisfactory properties. The presence of the mixed secondary amino/carbonyl units (IV) in the structure of the copolyesters in accordance with the present invention enables the average price of the raw materials to be decreased and consequently the cost of production of shaped articles produced from these copolyesteramides to be minimized. Furthermore, for example, in the case of molded articles, an appreciable improvement is observed in the values of certain mechanical properties, especially the values of flexural and torsional moduli and, in addition, a better retention of the mechanical properties as a function of temperature is also observed (when compared with the shaped polymers devoid of such mixed recurring units).

The mechanical properties, particularly those of thin articles, can be further increased by a heat treatment at elevated temperature, below the melting temperature of the polymer.

Depending upon the particular application intended therefor, the copolyesteramides according to the invention may include additives such as, in particular, colorants, stabilizers against the effects of light, oxygen and heat, fillers or reinforcing fillers, and fireproofing agents.

The copolyesteramides in accordance with the present invention may be prepared by various known polymerization processes.

For example, they may be prepared by reacting:

(1) methyl- and/or ethyl- and/or chloro- and/or bromohydroquinone, optionally mixed with another (or other) diphenol(s) such as, for example, unsubstituted hydroquinone and/or one or more hydroquinone(s) disubstituted with the above-mentioned groups, with (2) optionally, a derivative of terephthalic acid taken either alone or optionally mixed with a derivative of another aromatic dicarboxylic acid such as, for example, isophthalic acid, and with (3) a derivative of 2,6-dicarboxynaphthalene, and with (4) a derivative of para-aminobenzoic acid involving the acid group, also either alone or optionally mixed with a derivative of the same type of another aromatic amino acid such as, for example, meta-aminobenzoic acid, the said acid derivative being either a halide such as, for example, a chloride, or an aryl ester such as, for example, a phenyl, tolyl or naphthyl ester (the said derivative obviously being a dihalide or a diester in the case of a dicarboxylic acid). The reaction is generally carried out in the presence of a catalyst, such as those described in Canadian Patent No. 735,543.

In this process, the reactants are employed in proportions such that:

(i) the molar ratio diphenol(s)/diacid derivatives ranges from 0.95 to 1.05;

(ii) the amount of terephthalic acid derivative in the mixture of terephthalic acid derivative+2,6-dicarboxynaphthalene derivative ranges from 0 to 80 mol %, and preferably from 20 to 70 mol %;

(iii) the amount of para-aminobenzoic acid derivative ranges from 5 to 100 mol % relative to the amount of monosubstituted hydroquinone(s), and preferably from 10 to 60 mol %; and (iv) the total amount of the reactants employed, other than the monosubstituted hydroquinone(s), the terephthalic acid derivative, the 2,6-dicarboxynaphthalene derivatives and the para-aminobenzoic acid derivative, does not exceed 10 mol % relative to the amount of monosubstituted hydroquinone(s).

The copolyesteramides produced according to this first process generally have end groups which are, on one end of the molecule, of the phenolic H and/or of the $NH_2$ H type and, on the other end of the molecule, of the halide or aryloxy type.

It is also possible to prepare the copolyesteramides according to the invention by direct esterification and amidification between the diphenol(s) envisaged, the aromatic dicarboxylic acids and the aromatic amino acid(s). The copolyesteramides thus obtained generally have end groups of the phenolic H type and/or of the $NH_2$ H and acidic OH type.

Preferably, however, a third process employing an acidolysis reaction is employed. In accordance with this preferred process:

(1) a diester of methyl- and/or ethyl- and/or chloro- and/or bromohydroquinone, optionally mixed with one or more diesters of another (or other) diphenol(s) such as, for example, unsubstituted hydroquinone and/or one or more hydroquinone(s) disubstituted with the above-mentioned groups, is reacted with (2) optionally, terephthalic acid taken either alone or optionally mixed with another aromatic dicarboxylic acid such as, for example isophthalic acid, and with (3) 2,6-dicarboxynaphthalene, and with (4) a para-aminobenzoic acid derivative acylated on the amine group, taken either alone or optionally mixed with an acylated derivative of the same type of another aromatic amino acid such as, for example, meta-aminobenzoic acid, the said diphenol diester being prepared from an alkanoic acid containing from 2 to 6 carbon atoms such as, for example, an acetic ester and the said amino acid derivative acylated on the amine group being prepared from an anhydride or a halide such as, for example, a chloride derived from an alkanoic acid containing from 2 to 6 carbon atoms such as, for example, an acetylated derivative.

Here, too, the reaction is generally carried out in the presence of a catalyst such as, especially, sodium, magnesium, manganese and zinc acetate, butyl titanate and antimony trioxide. It generally begins at a temperature of from 260° C. to 310° C., and then the acid formed distills off. After approximately 80% of the acid theoretically to be distilled off has been collected, the temperature is progressively increased to a value above the temperature selected for beginning the reaction and ranging from 280° C. to 330° C., while the pressure is progressively reduced. When the distillation of acid is complete, the polycondensation is continued under a high vacuum for a period of time which may range up to 30 minutes or more.

In this acidolysis process, the reactants are employed in proportions such that:

(i) the molar ratio diester(s) of diphenol(s)/total diacids ranges from 0.95 to 1.05;

(ii) the amount of terephthalic acid in the mixture of terephthalic acid+2,6-dicarboxynaphthalene ranges from 0 to 80 mol %, and preferably from 20 to 70 mol %;

(iii) the amount of the para-aminobenzoic acid derivative acylated on the amine group ranges from 5 to 100 mol % relative to the amount of diester(s) of monosubstituted hydroquinone(s), and preferably from 10 to 60 mol %; and (iv) the total amount of the reactants employed, other than the diester(s) of monosubstituted hydroquinone(s), terephthalic acid, 2,6-dicarboxynaphthalene and the acyl derivative of para-aminobenzoic acid, is not more than 10 mol % relative to the amount of diester(s) of monosubstituted hydroquinone(s).

The copolyesteramides obtained according to this third process generally have end groups which are, on one end of the molecule, of the alkoxy and/or acylamino type and, on the other end, of the acid OH type.

In order to further illustrate the present invention and the advantages thereof, the following specific examples are given, it being understood that same are intended only as illustrative and in nowise limitative.

In said examples to follow, a certain number of controls were carried out on the copolyesteramides produced. The operating procedures and/or the standards according to which these controls were carried out are given below:

Torsional modulus:

This was determined at various temperatures using an automatic torsional pendulum at a frequency on the order of 1 hertz according to the ISO Standard R 537 method B, the test specimens being conditioned at an RH of 50 according to NF Standard T 51 014. The results are expressed in MPa.

Tensile test:

The tensile strength and modulus were measured at 23° C. in accordance with the NF Standard T 51 034 on dumbbell-type specimens with a width of 4 mm and a thickness of 2 mm, conditioned at an RH of 50. The results are expressed in MPa.

Flexural modulus:

This determination was carried out at 23° C. in accordance with the NF Standard T 51 001 on 80×8×4 mm bar-type specimens, conditioned at an RH of 50. The results are expressed in MPa.

Charpy impact strength:

This was carried out at 23° C. in accordance with the NF Standard T 51 035 on 60×10×4 mm bar-type test specimens incorporating U-shaped notches, conditioned at an RH of 50. The results are expressed in $kJ/m^2$.

EXAMPLE 1

The following reactants and catalyst were introduced into a stirred and heated polycondensation reactor equipped with a device for distillation and for purging with an inert gas:
(1) chlorohydroquinone diacetate: 45.70 g
[molar ratio (1)/(2)+(3)=1];
(2) terephthalic acid: 22.08 g
[66 mol % in the mixture of (2)+(3)];
(3) 2,6-dicarboxynaphthalene: 14.47 g
[34 mol % in the mixture of (2)+(3)];
(4) para-acetamidobenzoic acid: 7.16 g
[20 mol % relative to (1)];
(5) magnesium acetate: 0.045 g
[500 ppm].

The reactor was purged with nitrogen and was then heated with a metal bath set at 300° C. Acetic acid began to distill after a few minutes, the first drop of acid which distilled over corresponding to time zero. After 120 minutes, 22.2 $cm^3$ of acetic acid (88.4% of theory) were collected. The temperature of the metal bath was then progressively increased to 330° C. in 14 minutes. Over the same time period, the pressure was reduced from 1,010×10$^2$ Pa to 13.3×10$^2$ Pa. Heating at 330° C. was continued for 42 minutes while the pressure was reduced to 0.39×10$^2$ Pa during the same time period. The total volume of acetic acid distilled was 24 $cm^3$ (i.e., 95.6% of theory).

The polymer obtained was light grey and fibrous in appearance. The flow temperature was 300° C. The anisotropy region ranged from 300° C. to more than 360° C.

The results of the tensile, flexural and impact measurements are reported in the Table below.

With regard to molded test specimens permitting the mechanical properties to be measured, these were prepared using a screw press known to the art under the trademark KAP. For this purpose, the copolyesteramide obtained was milled and was then dried at 150° C. for 4 hours and then injection-molded under the following conditions:
(i) temperature of the melt vessel: 320° C.
(ii) mold temperature: 25° C.
(iii) injection pressure: 22.5 MPa.

As a comparative test (test A), the same operations as described above were repeated, but without including any para-amidobenzoic acid. The reactants and the catalyst employed were therefore as follows:

(1) chlorohydroquinone diacetate: 45.70 g
[molar ratio (1)/(2)+(3)=1];
(2) terephthalic acid: 22.08 g
[66 mol % in the mixture of (2)+(3)];
(3) 2,6-dicarboxynaphthalene: 14.47 g
[34 mol % in the mixture of (2)+(3)];
(4) magnesium acetate: 0.041 g
[500 ppm].

In this test, a volume of 22.4 $cm^3$ of acetic acid was recovered (i.e., 97.8% of theory). The polymer obtained was grey and fibrous in appearance. The flow temperature was 290° C. The anisotropy region ranged from 300° C. to more than 360° C.

EXAMPLE 2

The following materials were introduced into the same apparatus as that described in Example 1:
(1) chlorohydroquinone diacetate: 45.70 g
[molar ratio (1)/(2)+(3)=1];
(2) terephthalic acid: 22.08 g
[66 mol % in the mixture of (2)+(3)];
(3) 2,6-dicarboxynaphthalene: 14.47 g
[34 mol % in the mixture of (2)+(3)];
(4) para-acetamidobenzoic acid: 14.32 g
[40 mol % relative to (1)];
(5) magnesium acetate: 0.048 g
[500 ppm].

The reaction was carried out as indicated in Example 1. A volume of 27 $cm^3$ of acetic acid was recovered (98.5% of theory). The polymer obtained was light grey and fibrous in appearance. The flow temperature was 300° C. The anisotropy region ranged from 300° C. to more than 360° C. The results of tensile, flexural and impact measurements are reported in the Table below.

EXAMPLE 3

The following materials were introduced into the same apparatus as that described in Example 1:
(1) chlorohydroquinone diacetate: 45.70 g
[molar ratio (1)/(2)+(3)=1];
(2) terephthalic acid: 16.60 g
[50 mol % in the mixture of (2)+(3)];
(3) 2,6-dicarboxynaphthalene: 21.60 g
[50 mol % in the mixture of (2)+(3)];
(4) para-acetamidobenzoic acid: 7.16 g
[20 mol % relative to (1)];
(5) magnesium acetate: 0.046 g
[500 ppm].

The reaction was carried out as indicated in Example 1. A volume of 24.8 $cm^3$ of acetic acid was recovered (98.8% of theory). The polymer obtained was light grey and fibrous in appearance. The flow temperature was 300° C. The anisotropy region ranged from 300° C. to more than 360° C. The results of the tensile, flexural and impact measurements are reported in the Table below.

TABLE

| EXAMPLE/TEST | TENSILE Strength MPa | TENSILE Modulus MPa | FLEXURAL Modulus MPa | CHARPY IMPACT $kJ/m^2$ |
|---|---|---|---|---|
| A | 105 | 3,330 | 7,006 | 7.9 |
| 1 | 102 | 3,165 | 10,308 | 10.7 |
| 2 | 51 | 2,849 | 9,036 | 6.5 |
| 3 | 130 | 3,290 | 9,171 | 9.4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A moldable/extrudable, high molecular weight thermotropic aromatic copolyesteramide comprising recurring structural units of the formulae (I), (III) and (IV), and optionally (II), wherein:

(I) represents the structure: 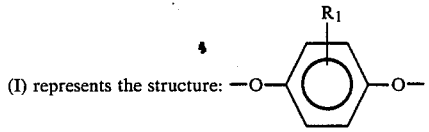

in which $R_1$ is a methyl or ethyl radical or a chlorine or bromine atom, with the proviso that the units (I) are identical or different;

(II) represents the structure: 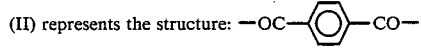

(III) represents the structure: 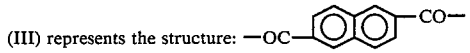

(IV) represents the structure: 

the molar ratio of the units (I) relative to the sum of the units (II)+(III) ranges from 0.95 to 1.05;
the amount of the units (II) in the mixture of (II)+(III) ranges from 0 to 80 mol % and that of the units (III), on the same basis, ranges from 100 to 20 mol %;
the amount of the units (IV), expressed relative to the amount of the units (I), ranges from 5 to 100 mol %; and
said copolyesteramide having a flow temperature ranging from 200° to 350° C.

2. The thermotropic copolyesteramide as defined by claim 1, wherein the amount of the units (II) in the mixture of (II)+(III) ranges from 20 to 70 mol % and that of the units (III), on the same basis, ranges from 80 to 30 mol %, and the amount of the units (IV), expressed relative to the amount of the units (I), ranges from 10 to 60 mol %.

3. The thermotropic copolyesteramide as defined by claim 2, wherein the units (I) are identical and the substituent $R_1$ is a methyl radical or a chlorine atom.

4. The thermotropic copolyesteramide as defined by claim 1, having a flow temperature ranging from 260° to 330° C.

5. The thermotropic copolyesteramide as defined by claim 1, further comprising at least one additional recurring structural unit selected from the group consisting of aromatic dioxy structural units, recurring aromatic dicarbonyl structural units, mixed aromatic secondary amine/carbonyl structural units and mixtures thereof, said at least one additional recurring structural unit having a structure other than that of the units (I), (II), (III), and (IV), the total amount of such additional structural units being not more than 10 mol % relative to the amount of the units (I).

6. The thermotropic copolyesteramide as defined by claim 5, said additional recurring structural units having the formulae (I'), (I''), (II') or (IV') or mixtures thereof:

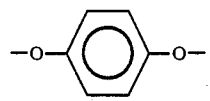 (I')

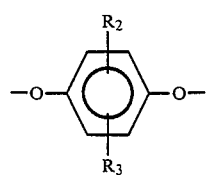 (I'')

in which $R_2$ and $R_3$, which are identical or different, each have the definition given for $R_1$, with the proviso that the units (I'') are identical or different,

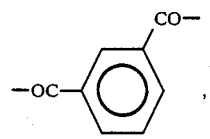 (II')

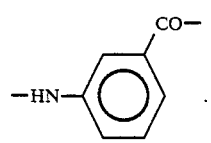 (IV')

7. A process for preparing a thermotropic copolyesteramide as defined by claim 1, comprising reacting:
(1) a diester of methyl- and/or ethyl- and/or chloro- and/or bromohydroquinone or mixture thereof with one or more diesters of another or of other diphenol(s), with
(2) optionally, terephthalic acid or mixture thereof with another aromatic dicarboxylic acid, with
(3) 2,6-dicarboxynaphthalene, and with
(4) a derivative of para-aminobenzoic acid acylated on the amine group, or mixture thereof with an acylated derivative of another aromatic amino acid, the said diphenol diester being prepared from an alkanoic acid containing from 2 to 6 carbon atoms and the said derivative of amino acid acylated on the amine group being prepared from an anhydride or a halide derived from an alkanoic acid containing from 2 to 6 carbon atoms, the reactants being employed in proportions such that:
(i) the molar ratio diester(s) of diphenol(s)/total diacids ranges from 0.95 to 1.05,
(ii) the amount of terephthalic acid in the mixture of terephthalic acid+2,6-dicarboxynaphthalene ranges from 0 to 80 mol %,
(iii) the amount of derivative of para-aminobenzoic acid acylated on the amine group ranges from 5 to 100 mol % relative to the quantity of diester(s) of monosubstituted hydroquinone(s), and
(iv) the total amount of the reactants employed, other than the diester(s) of monosubstituted hydroquinone(s), terephthalic acid, 2,6-dicarboxynaphthalene and the acylated derivative of para-aminobenzoic acid is not more than 10 mol % relative to the amount of diester(s) of monosubstituted hydroquinone(s).

8. The process as defined by claim 7, comprising reacting:
(1) as other diphenol(s), unsubstituted hydroquinone one or more hydroquinone(s) disubstituted with at least one substituent selected from the group consisting of methyl, ethyl, chloro and bromo groups, or mixtures thereof,
(2) as another aromatic dicarboxylic acid, isophthalic acid, and
(4) as another aromatic amino acid, meta-aminobenzoic acid.

9. A shaped article comprising a thermotropic aromatic copolyesteramide as defined by claim 1.

10. A shaped article as defined by claim 9, comprising a fiber.

11. A shaped article as defined by claim 9, comprising a film.

12. A shaped article as defined by claim 9, comprising an extrudate.

13. A shaped article as defined by claim 9, comprising a molded substrate.

* * * * *